United States Patent [19]

Bic et al.

[11] 4,433,310
[45] Feb. 21, 1984

[54] MODULATOR-DEMODULATOR FOR FOUR LEVEL DOUBLE AMPLITUDE MODULATION ON QUADRATURE CARRIERS

[76] Inventors: Jean-Claude Bic, 10 bis rue des 3 Yvonne, F-94100 St Maur; Pierre C. Brossard, 9, rue des Fleurs, F-78190 Montigny-le-Bretonneux; Daniel Duponteil, 45, rue Anatole France, F-92370 Chaville, all of France

[21] Appl. No.: 219,318

[22] Filed: Dec. 22, 1980

[30] Foreign Application Priority Data

Dec. 31, 1979 [FR] France ................................ 79 32166

[51] Int. Cl.³ .......................... H03C 1/00; H03D 1/00
[52] U.S. Cl. ..................................... 332/9 R; 329/50; 329/105; 329/135; 332/41; 332/42; 375/42; 375/96
[58] Field of Search ................. 330/10; 332/31 R, 40, 332/41, 9 R, 16 R, 42; 73/141; 328/133; 329/50, 104, 105, 107, 109, 135; 375/41, 42, 94, 96

[56] References Cited

U.S. PATENT DOCUMENTS

| | | | |
|---|---|---|---|
| 3,204,029 | 8/1965 | Groff et al. | 178/68 |
| 3,740,655 | 6/1973 | Dickey | 328/133 X |
| 4,015,222 | 3/1977 | Werner | 332/9 R |
| 4,236,042 | 11/1980 | Leitch | 332/40 X |

*Primary Examiner*—Siegfried H. Grimm
*Attorney, Agent, or Firm*—Laff, Whitesel, Conte & Saret

[57] ABSTRACT

A modulator in which an input train of digital pulses is encoded to produce two encoded trains of digital pulses which are used to respectively modulate two out of phase carrier components. The two modulated carrier components are combined to produce a modulated output signal. A demodulator recovers carrier and clock signals from the modulated signal and combines these with the modulated signal to recover the input train of digital pulses.

5 Claims, 7 Drawing Figures

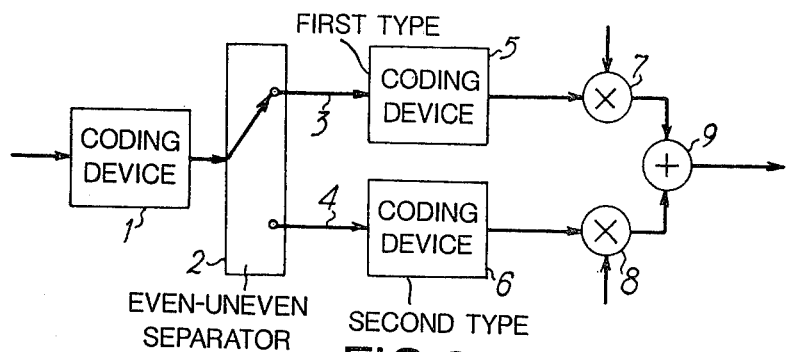
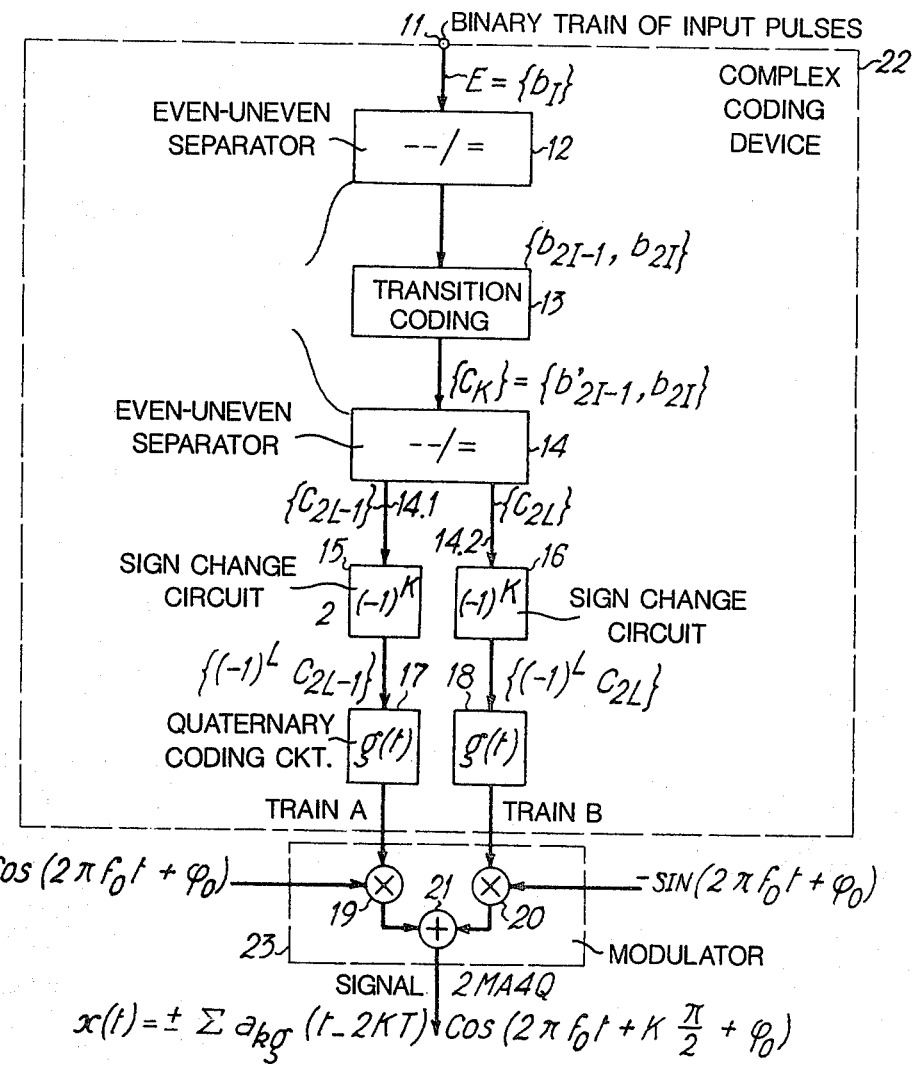

ENCODER OF FIG.3

MODULATOR-DEMODULATOR FOR FOUR LEVEL DOUBLE AMPLITUDE MODULATION ON QUADRATURE CARRIERS

The present invention relates to a modulator-demodulator for four level double amplitude modulation on quadrature carriers.

At present, the most commonly used numerical modulations are the modulations by phase displacement with two states, called "MDP2" (in the United States called "BPSK" binary phase shift keying) modulations, and the four state phase displacement modulation called "MDP4" (in the United States called "QPSK" quadrature phase shift keying) modulation. The latter modulation (QPSK) makes possible a division by two of the frequency band which is necessary relative to the BPSK modulation.

For a few years, a definite effort has been made to use modulations with a higher number of states, and, especially, sixteen state modulations, which make possible a division by two of the necessary frequency band, relative to the QPSK modulation.

Among the sixteen state modulations, which have been the object of theoretical and of practical studies, the modulation by amplitude displacement on sixteen state quadrature carriers, (in the United States called "QASK" quadrature amplitude shift keying differential encoding), has retained attention because it is among the simplest form of modulations to operate, while having good performances. In fact, the QASK modulation may be considered as being simple to use, as far as the modulation aspect is concerned.

It will be recalled that an QASK modulation is a double amplitude numerical modulation with two quadrature carriers. An QASK signal may be written as follows:

$$S(t) = a_1(t) \cos(2\pi f_o t + \rho_o) - a_2(t) \sin(2\pi f_o t + \rho_o)$$

$$a_1(t) = \sum_i a_{2i} R_{2\Delta}(t - 2i\Delta)$$

$$a_2(t) = \sum_i a_{2i+1} R_{2\Delta}(t - 2i\Delta)$$

The succession of the $a_i$ signals is obtained by transformation in a coding device, from the succession of the $\{d_k\}$ binary symbols which are to be transmitted, the $a_i$ symbols representing the q levels of the coding. It is assumed that the $a_i$ signals are not correlated, and therefore that the $a_1(t)$ and $a_2(t)$ signals also are not correlated and even have a spectrum.

One object of the present invention is to provide for a modulation with which the modulated signal has sixteen states and to provide for sepctral and filtering characteristics, as well as performances, which in all points are identical with those of a signal modulated in QASK 16 modulation. After object is to provide a modulator which is relatively less complex than is a QASK 16 modulator, with the modulating device being extremely simple to operate.

The above-indicated characteristics of the present invention, as well as others, will appear more clearly upon a reading of the following description of an example of the invention with the description being given relative to the attached drawing in which:

FIG. 1 is a simplified diagram of a modulator of a known type for QASK modulations;

FIG. 2 is a simplified block diagram of a modulator according to the present invention, for quadrature modulations;

Figure 3:
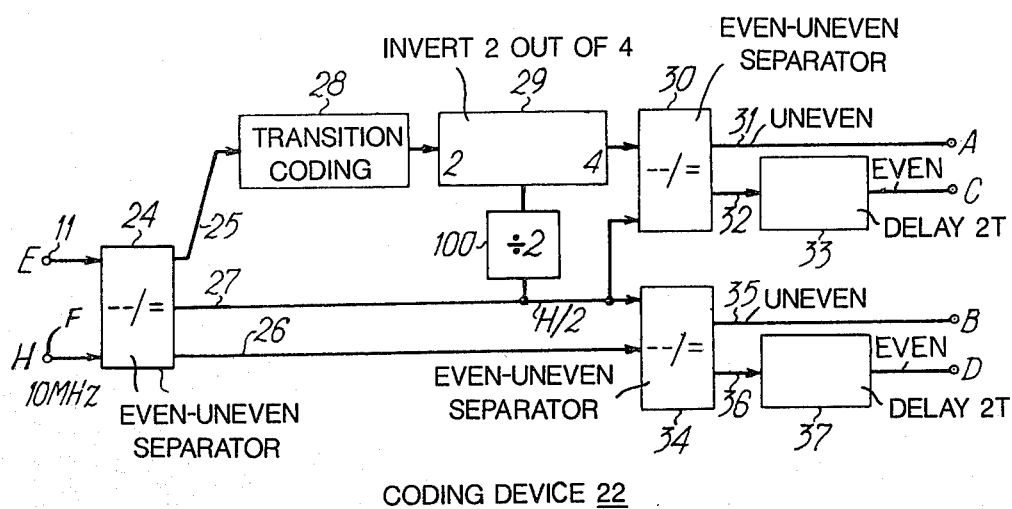
FIG. 3 is a simplified block diagram for a coding device which is usable in the modulator in FIG. 2.

A known modulator for the QASK modulation is represented in FIG. 1. It comprises a coding device 1, the input of which receives a transmitted pulse train or succession of binary elements and the output of which delivers the succession of the $a_i$ signals. The output of coding device 1 is connected to an even-uneven separator circuit 2 (symbolized by a reversing contact which separates even numbered pulses from odd numbered pulses). One output 3 of separator 2 is connected to the input of a first signal type binary coding device 5, and an output 4 is connected to the input of a first signal type binary coding device 6.

Switch 2 directs the signals applied to it alternately toward output 3 and toward output 4 (e.g. odd numbered pulses go to circuit 5 and even numbered pulses go to circuit 6). Thus, at output 3, the signals $a_{2i+1}$ are obtained and, at output 4, the signals $a_{2i}$ are obtained. At the output of binary coding device 5, there is obtained the signal $a_2(t)$ and, at the output of binary coding device 6, there is obtained the signal $a_1(t)$. The output of coder 5 is connected to an input of a multiplying device 7, the other input of which receives the $-A \sin(2\pi f_o t + \phi_o)$. The output of coder 6 is connected to an input of the multiplying devices 8, the second input of which receives the signal $A \cos(2\pi f_o t + \phi_o)$. The outputs of the multiplying devices 8 and 7 respectively are connected to the inputs of an adding device 9, the output of which delivers the signal s(t). It can be seen that that modulator is relatively simple.

Unfortunately, the modulator of FIG. 1 presents an important difficulty, with respect to the demodulation side of the system and, more especially, with respect to the recovery of the carrier. The demodulation must be a coherent demodulation, that is to say, it must use a reference signal called the "recovered carrier", which is extracted from the signal that is received and which must also be as close as possible to the carrier that is used for transmission.

It so happens that the recovered carrier usually prevents several possible phase determinations. That is what is called the phase ambiguity phenomenon. In the QASK 16 modulation, there is a high order of these ambiguities. It is impossible to reduce the ambiguities by the coding-decoding modes used in phase shift keying modulation. Parasitic phases remain which must be eliminated by the demodulated signal, thus leading to demodulating devices which are highly complex and, especially, much more complex than a QPSK demodulator.

It will be recalled that with the binary or quadrature phase shift key modulations, the phase of the carrier which is recovered in the demodulating device is known with an approximate accuracy of $2\pi/n$. However, the problem of the phase ambiguity can be solved in a simple manner. Indeed, it is sufficient to proceed to a coding by a transition of the numerical message to be transmitted. Then, at the reception, decoding proceeds by transition, at the cost of a doubling of the rate of error on the binary elements.

With the quadrature modulation according to the present invention, the modulated carrier is, as in a quadrature modulation, obtained by the addition of two quadrating carriers, amplitude modulated by two numerical successions in a low frequency band with four possible levels. However, the clock pulses of the numerical successions are dephased by $\pi$, that is to say they are of opposite signs.

Thus, if the modulator receives a numerical succession with a delivery rate of flow of 1/T, the signal modulated in quadrature can be written:

$$x(t) = \sum_L (-1)^L a_{2L} g(t - 4LT) \cos(2\pi f_o t + \rho_o) \quad (1)$$

$$- \sum_L (-1)^L a_{2L+1} g(t - 4LT - 2T) \sin(2\pi f_o t + \rho_o)$$

or also in the form:

$$x(t) = \sum_K a_k g(t - 2kT) \cos\left(2\pi f_o t + k\frac{\pi}{2} + \rho_o\right) \quad (2)$$

Formula (1) is an expression of the two modulating trains or successions.

In order to demodulate the signal in Formula (2), a reference signal y(t) is used, such as:

$$y(t) = B \cos\left[2\pi \left(f_o + \frac{1}{8T}\right) t + \rho_o\right] \quad (3)$$

By multiplying the x(t) signal by the reference y(t), and then by keeping only the low frequency expression, the demodulated signal is explained by the following expression:

$$z(t) = \sum_K a_k g(t - 2kt) \cos\left[\frac{\pi}{4T}(t - 2kT)\right] \quad (4)$$

A sampling of the z(t) signal at a frequency of 1/T, that is to say every 2T seconds, makes it possible to recover the $a_k$ symbols and, consequently, the binary numerical succession, with the exception of the transmission errors.

The above reasoning has been carried out without taking into account the filtering through the transmission channel of the signal modulated in quadrature, but it would be exactly the same when taking into account said transmission filtering.

At demodulation, a circuit for recovering the carrier supplies the y(t) signal, with a signal sign ambiguity. The succession or pulse of the $a_k$ signals is thus recovered with the exception of the sign. Consequently, prior to the modulation properly speaking, there is an encoding by transition and, after demodulation, a decoding by transition.

It must further be noted that, if the modulated signal is taken in the form:

$$x^*(t) = \Sigma a_k g(t - 2kT) \cos\left(2\pi f_o t - k\frac{\pi}{2} + \rho_o\right) \quad (5)$$

the demodulation is done using the y*(t) reference, such as:

$$y^*(t) = \left[\cos 2\pi \left(f_o - \frac{1}{8T}\right) t + \rho_o\right] \quad (6)$$

which is also supplied by the carrier recovery circuit.

The diagram in FIG. 2 makes it possible to illustrate the functioning of a modulator capable of delivering a quadrature modulation signal according to the present invention.

Input 11 which receives a binary succession or train E={$b_I$}, to be transmitted, is connected to the input of an even-uneven separating circuit 12 which delivers a quaternary train {$b_{2I-1}$·$b_{2I}$}. The output of circuit 12 is connected to the input of a coding by transition circuit 13 which codes, by transition, the binary elements of the uneven train or the succession of the quaternary train applied by 12. Therefore, circuit 13 delivers the quaternary train according to:

$$\{c'_k\} = \{b'_{2I-1} \cdot b_{2I}\}$$

The output of coding circuit 13 is connected to an even-uneven separating circuit which delivers, at its output 14.1, the uneven pulse train or succession {$C_{2L-1}$} and, on its outlet 14.2, the even train or succession {$C_{2L}$}. The output 14.1 is connected to the input of a circuit 15 which changes the sign of every second entering symbol (i.e. the uneven pulses), and which therefore delivers the train or succession {$(-1)^L C_{2L-1}$}. Output 14.2 is connected to the input of a circuit 16 which operates as circuit 15 and which delivers the train or succession {$(-1)^L C_{2L}$}. The output of circuit 15 is connected to the input of a quaternary coding circuit 17, while the output of circuit 16 is connected to the input of a quaternary coding circuit 18. Circuit 17 is connected to an input of a multiplying device 19, the second input of which receives the carrier signal cos ($2\pi f_o t + \phi_o$). The output of circuit 18 is connected to an input of a multiplying device 20, the second input of which receives the signal $-\sin(2\pi f_o t + \phi_o)$. The outputs of multiplying devices 19 and 20 are respectively connected to the inputs of an adding device 21 which delivers the signal x(t) corresponding to formula (1).

In the diagram in FIG. 2, it is possible to distinguish a first complex or coding device 22 which includes the elements 12 to 18, and a second complex or unit, or modulation part 23, which includes the elements 19 to 21.

FIG. 3 shows a block-diagram of coding device 22, which corresponds to a possible embodiment while the block-diagram in FIG. 2 mostly corresponds to a functional unit.

To input 11, there is applied the binary train E, while to input F there is applied the clock signal H. The even-uneven separating circuit 24 receives the binary train E, and the clock (signal) H and delivers on its output 25, the uneven succession, on its output 26 the even succession and on its output 27 a clock signal the frequency of which is one half the clock frequency (i.e. H/2). Output 25 is connected to the transition type coding device 28, the output of which is connected to the input of a circuit 29, which inverts two binary elements out of four. Output 27 further is connected to the clock input of circuit 29 by a divider 100 which divides the frequency by two. The output of circuit 29 is connected to the signal input of an even-uneven separating circuit 30, the clock input of which receives the H/2 signal. Circuit 30 delivers on its output 31 the uneven succession A and on its output 32 the even succession which is applied to a time delay circuit 33 which delivers train or succession C. Output 26 is connected to the signal input of an even-uneven separting circuit 34, the clock input of which receives the H/2 signal. Circuit 34 delivers on its output 35 the uneven train B and on its output 36 the even train or succession which is applied to a time delay circuit 37 which delivers train or succession D. The time delays of circuits 33 and 37 are equal to 2T, in which T is the period of a binary element.

Figure 4:
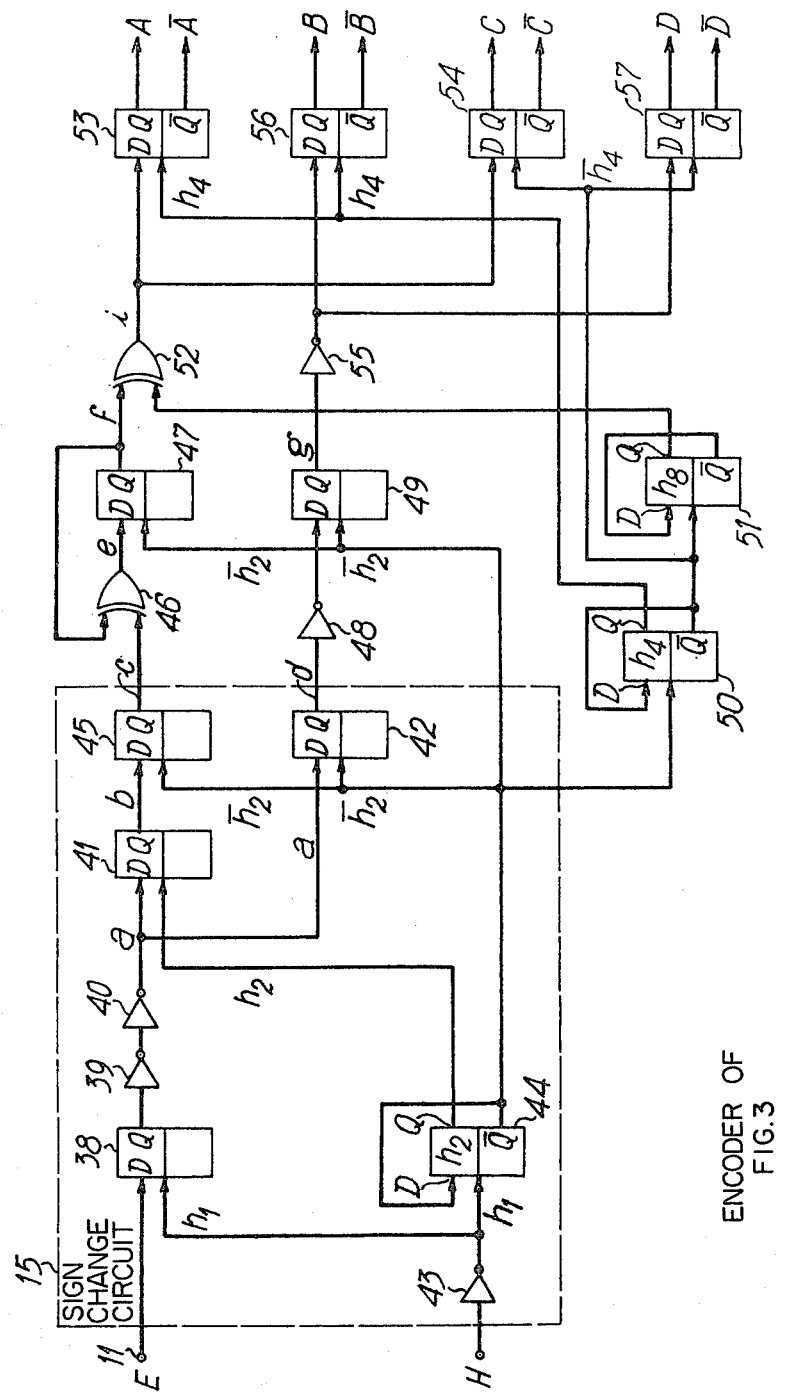
FIG. 4 is the detailed diagram of a coding device, according to the coding device in FIG. 3.

FIG. 4 shows a detailed diagram of the encoding circuit in FIG. 3. Input 11 is connected to input D of a D-flip-flop 38 the output Q of which is connected to the input of an inverter 39, the output of which is connected to the input of an inverter 40, the output of which is connected on one side to the input D of a D flip-flop 41. On the other or Q side, flip-flop 41 is connected to the input D of a D flip-flop 42. The clock input of flip-flop 38 is connected to receive the output of an inverter 43. The input of inverter 43 receives the clock signal H. The output of inverter 43 is further connected to the clock input of a D flip-flop 44 the $\overline{Q}$ output of which is connected to its input D and the output Q of which is connected to the clock input of flip-flop 41. The output $\overline{Q}$ of flip-flop 44 also is connected in parallel to the clock inputs of flip-flops 42 and 45.

The output Q of flip-flop 45 is connected to an input of an exclusive OR gate 46, the output of which is connected to the input D of a D flip-flop 47. Flip-flop 47 has its output Q connected to the second input of the exclusive OR gate 46 and its clock input connected to output $\overline{Q}$ of flip-flop 44. Output Q of flip-flop 42 is connected through an inverter 48 to the input D of D flip-flop 49 the clock input of which also is connected to the output $\overline{Q}$ of flip-flop 44. The output $\overline{Q}$ of flip-flop 44 further is connected to the clock input of a D flip-flop 50 the output $\overline{Q}$ of which is connected for one part to its input D and for the other part, to the clock input of a D flip-flop 51, the output $\overline{Q}$ of which is also connected to the input D of flip-flop 51. The outputs Q of flip-flops 47 and 51 respectively are connected to two inputs of an exclusive OR gate 52 the output of which is connected, for one part to the input D of a D flip-flop 53 and, for the other part, to the input D of a D flip-flop 54. The output Q of flip-flop 49 is connected, through inverter 55, for one part to the input D of D flip-flop 56 and, for the other part, to the input D of D flip-flop 57. The clock inputs of flip-flops 53 and 56 are connected to output Q of flip-flop 50, while the clock inputs of flip-flops 54 and 57 are connected to the output $\overline{Q}$ of flip-flop 50.

Figure 5:
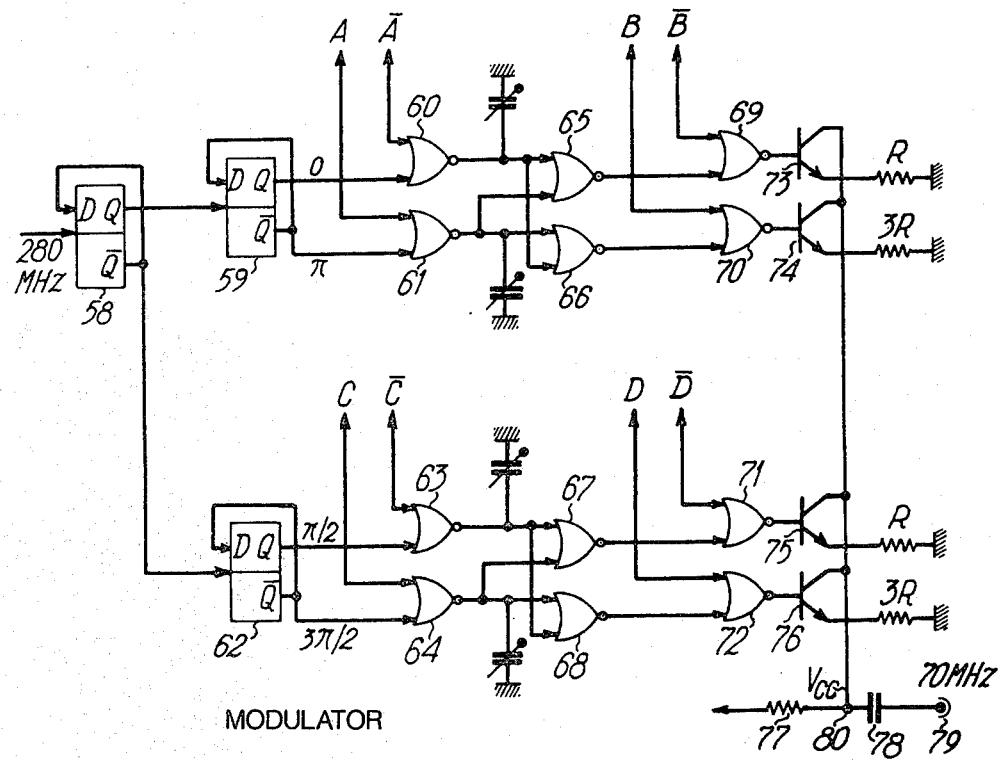
FIG. 5 is the detail diagram of the modulation part of a modulator according to the present invention, usable with the coding device in FIG. 4.

FIG. 5 represents a detailed diagram of the modulation part of a modulator means, according to the present invention, to be coupled to the output of the coding device in FIG. 4. A D flip-flop 58 has its clock input connected to receive the signal with the carrying frequency of 280 MHz, its output $\overline{Q}$ is connected to its input D and its output Q is connected to the clock input of a D flip-flop 59. The output Q of flip-flop 59 is connected to an input of a NOR gate 60 the second input of which is connected to the output $\overline{Q}$ of flip flop 53 (FIG. 4). The output Q of flip-flop 59 is connected for one part to the input D of flip-flop 59 and, for the other part, to an input of a NOR gate 61, the second input of which is connected to the output $\overline{Q}$ of flip-flop 53 (FIG. 4). The output $\overline{Q}$ of flip-flop 59 further is connected to the clock input of a D flip-flop 62. The output Q of flip-flop 62 is connected to an input of a NOR gate 63 the other input of which is connected to the output $\overline{Q}$ of flip-flop 54 (FIG. 4). The output $\overline{Q}$ of flip-flop 62 is connected, for one part, to the input D of flip-flop 62 and, for the other part, to an input of a NOR gate 64 the other input of which is connected to the output Q of flip-flop 54 (FIG. 4).

The output of gate 60 is respectively connected to the first inputs of two NOR gates 65 and 66, while the output of gate 61 is respectively connected to the second inputs of gates 65 and 66. The output of gate 63 is respectively connected to the first inputs of two NOR gates 67 and 68, while the output of gate 64 is respectively connected to the second inputs of gates 67 and 68. The output of gate 65 is connected to an input of a NOR gate 69 the second input of which is connected to the output $\overline{Q}$ of flip-flop 56. The output of gate 66 is connected to an input of a NOR gate 70 the other input of which is connected to the the output Q of flip-flop 56. The output of gate 67 is connected to an input of a NOR gate 71 the other input of which is connected to the output Q of flip-flop 57. The output of gate 68 is connected to an input of a NOR gate 72 the other input of which is connected to the output $\overline{Q}$ of flip-flop 57.

The outputs of the NOR gates 69 to 72 are respectively connected to the bases of four NPN transistors 73 to 76, the collectors of which are connected in parallel to a common line of supply $V_{cc}$, by means of a resistance 77. The emitting devices of transistors 73 and 75 respectively are connected to the ground by means of resistances having a value R, while the emitting devices of transistors 74 and 76 respectively are connected to the ground by resistances of a value 3R. The common point 80 to the collectors of the transistors and to resistance 77, is connected by means of a capacitor 78 to the outlet line 79 which delivers the modulated signal with a carrying frequency of 70 MHz.

Figure 6:
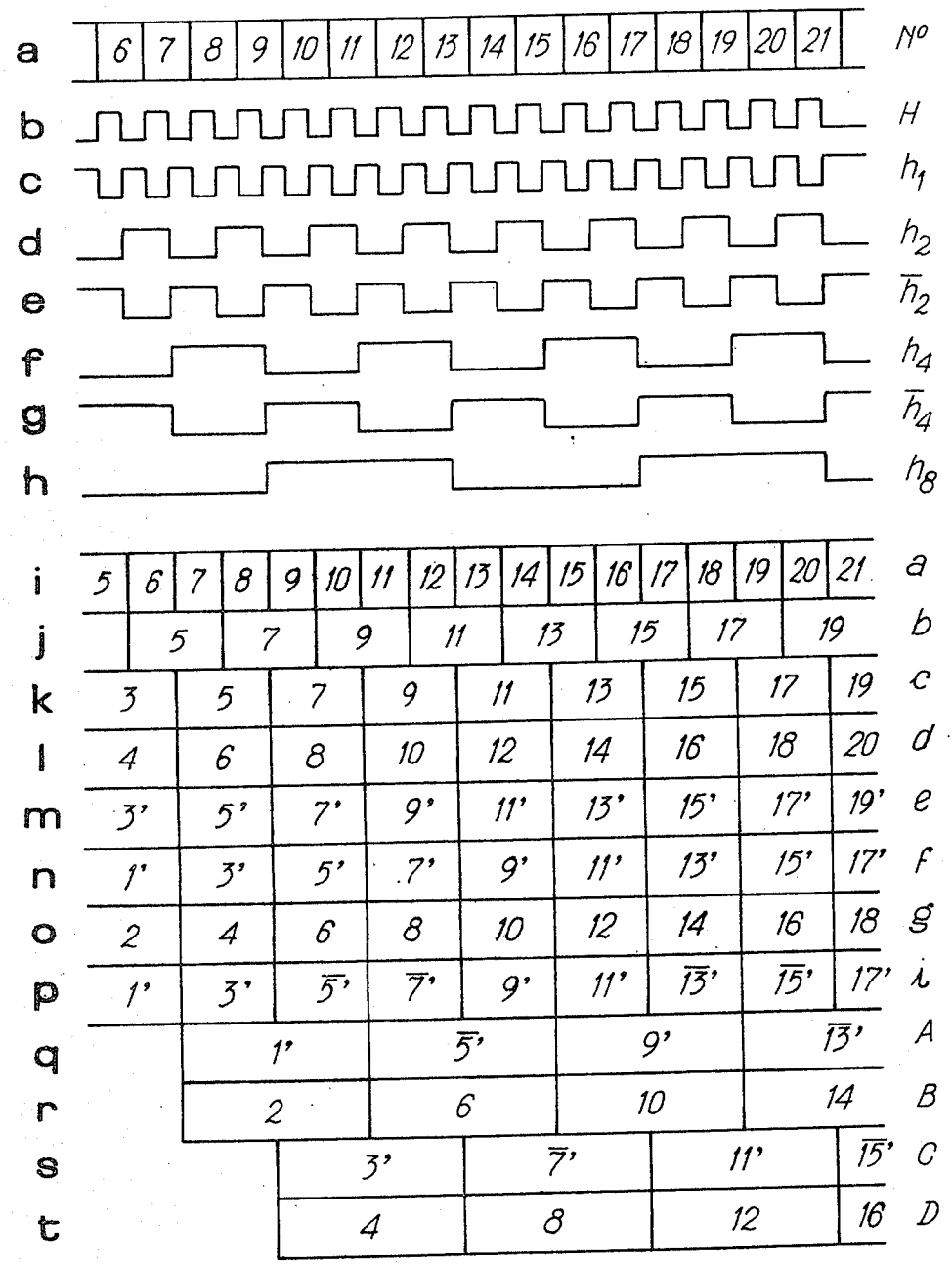
FIGS. 6a to 6t are time diagrams which are usable to illustrate the operations of the circuits in FIGS. 4 and 5.

FIG. 6a shows the chronological succession of the binary elements 6 to 21 of train E applied to the input 11 of the coding device. FIG. 6b shows the clock signal H applied to the input of inverter 43. FIG. 6c represents the signal $h_1$ ($h_1 = \overline{H}$) delivered at the output of inverter 43.

Flip-flop 44 is mounted as a divider by two, the exit Q of which delivers the signal $H_2$, represented in FIG. 6d, and the output of which, $\overline{Q}$, delivers the signal $\overline{h}_2$ represented in FIG. 6e.

Flip-flop 50 also is mounted as a divider by two, the output Q of which delivers the signal $h_4$, represented in FIG. 6f, and the output $\overline{Q}$ of which delivers the signal $\overline{H}_4$, represented in FIG. 6g.

Flip-flop 51 also is mounted as a divider by two, the output Q of which delivers the signal $h_8$, represented in FIG. 6h.

Inverters 39 and 40 only have, as their function, to delay the signal delivered by the output Q of flip-flop 38, in order to ensure a reading of that signal by the clock pulse, obtained on the output Q of flip-flop 44.

FIG. 6i represents the signal a delivered by the output Q of flip-flop 38, before it has been delayed by 30 and 40. Signal a, therefore, is signal E read by signal $h_1$. Consequently, FIG. 6i indicates the succession of binary elements in FIG. 6a, but delayed by T/2, when T is the period of the clock signal H.

FIG. 6j represents signal b delivered at the output of flip-flop 41. Signal b is the signal which is read by signal $h_2$. As signal $h_2$ has a period which is double that of signal $h_1$, signal b comprises only the binary elements of the uneven rank in signal a.

FIG. 6k represents the signal c delivered by output Q of flip-flop 45. Signal c is the signal b which is read by signal $\overline{h_2}$. Consequently, signal c corresponds to signal b, but delayed by T.

FIG. 6l represents the signal d delivered by the output Q of flip-flop 42. Signal d is signal a which is read by signal $h_2$. Consequently, as signal $\overline{h_2}$ has a period which is double that of signal $h_1$, signal d comprises only the binary elements of even rank of signal a. Moreover, signal d is synchronous with signal c. The whole of signals c and d forms the quaternary train or succession.

FIG. 6m represents the signal e delivered by gate 46. The signal e corresponds to signal c coded by transition. In FIG. 6m, the binary elements coded by transition are indicated by the same reference numbers as in FIG 6k, but which are accented (').

FIG. 6n represents the signal f delivered at the output Q of flip-flop 47. Signal f is the signal e read by signal $\overline{h_2}$, therefore, signal f corresponds to signal e delayed by 2T.

Inverter 48 delays signal d to compensate for the delay of signal c in gate 46. FIG. 6o represents signal g delivered to the output Q of flip-flop 49. Signal g is signal d which has been delayed and is being read by signal $\overline{h_2}$. Therefore signal g corresponds to signal d delayed by 2T. The group of signals f and g constitutes the quaternary train or succession, once the coding by transition has been performed on the uneven elements.

FIG. 6p represents signal i delivered by the output of OR gate 52. As OR gate 52 receives on one input the signal represented in FIG. 6h, gate 52 changes the sign of the binary elements of signal f every other symbol, the duration of two symbols being equal to 4T.

Gate 55 solely has as its object to delay signal g so as to compensate for the delay of the treatment in gate 52. Therefore, there is found again, at the output of 55, the signal g slightly delayed.

FIG. 6q represents signal A delivered by output Q of flip-flop 53. Signal A is signal i as read by signal $h_4$. As signal $h_4$ has a period which is double that of signal $h_2$, signal A comprises only the even rank symbols of signal i.

FIG. 6r represents the signal B delivered by the output Q of flip-flop 56. Signal B is signal g as read by signal $h_4$. As signal $h_4$ has a period which is double that of signal $h_2$, signal B only comprises the even rank symbols of signal g.

FIG. 6s represents signal C delivered by the output $\overline{Q}$ of flip-flop 54. Signal C is signal i as read by signal $\overline{h_4}$. As signal $h_4$ has a period which is double that of signal $h_2$, signal C only comprises the uneven rank symbols of signal i.

FIG. 6t represents signal D delivered by the output q of flip-flop 57. Signal D is signal g as read by signal $\overline{h_4}$. As signal $h_4$ has a period which is double that of signal $h_2$, signal D only comprises the uneven rank symbols of signal g.

It can therefore be seen that the group of flip-flops 41, 42 and 45 form, with flip-flop 44, the even-uneven separating device 12 in FIG. 2, that the unit formed by gate 46 and flip-flop 47 constitutes, with flip-flop 49, the coding device 13 by transition, that gate 52, with flip-flop 51, performs the change of sign treatment in circuits 15 and 16, and that the unit formed by flip-flop 53, 54, 56 and 57 forms, with flip-flop 50, an even-uneven separating device which performs the separation provided for in circuit 14 in FIG. 2.

The following Table defines the quaternary symbol/-signal coding used in the described example of execution, that is to say the correspondence between the quaternary symbols and the amplitude levels of the modulating signal.

TABLE

| Level Type Quaternary Coding. | |
|---|---|
| Symbol | Level |
| 11 | 3U |
| 10 | U |
| 00 | −U |
| 01 | −3U |

The quaternary symbols formed by couples (1', 2), (5', 6), (9', 10), etc. in FIGS. 6q and 6r cause, by the complementing of the binary element of uneven rank, one couple out of two, a change of sign of the corresponding level, as shows by studying of the above Table. The same is true for the symbols formed by the couples in FIGS. 6s and 6t.

Finally, the shifting of the clock pulses respectively applied to flip-flops 53 and 56, for one part and to flip-flops 54 and 57 for the other part, cause the dephasing between the signals which modulate the carriers in quadrature.

In the modulation part of FIG. 5, flip-flop 58 operates as a divider by two of the frequency. Its outputs Q and $\overline{Q}$ deliver signals at 140 MHz which are dephased by $\pi$. In the same manner, flip-flops 59 and 62 each operate as a divider by two of the frequency, and thus they deliver signals at 70 MHz. The clock signal of flip-flop 59 being assumed to be applied with a null phase, relative to the rising fronts, the output $\overline{Q}$ of flip-flop 59 delivers a phase signal while output Q of flip-flop 59 delivers a signal dephased by $\pi$. The clock signal of flip-flop 62 receives a dephasing of $\pi$, with respect to the rising fronts; therefore output Q of flip-flop 62 delivers a signal which is dephased by $\pi/2$ relative to output Q of flip-flop 59, and output $\overline{Q}$ delivers a signal dephased by $3\pi/2$, still relative to output Q of flip-flop 59.

The complex formed by gates 60, 61, 62, 66, 69 and 70 (FIG. 5) constitutes a multiplying device, such as 19 (FIG. 2), which performs the multiplying of train A receiver through the use-gate in the form of a choice of phase and of a choice of amplitude. Gate 66 receives the same signals as does gate 65 and it delivers the same signals. Gates 69 and 70 repectively combine the signals delivered by 65 and 66 with the signals B and $\overline{B}$ which decide between amplitude U and 3U.

As a function of the state 1 or 0 of the governing signal B, the 70 MHz signal with a 0 or $\pi$ determined by the governing signals A and $\overline{A}$ through gates 60 and 61, presents itself at the input of transistor 73 or of transistor 74, and finds itself affected, upon leaving, with an amplitude 3U (transistor 73 or with an amplitude U (transistor 74)).

Transistors 75 and 76, associated with gates 63, 64, 67, 68, 75 and 76, play the same role with respect to the quadrature component and they deliver a signal which adds itself to that signal which is delivered by transistors 73 and 74. As the capacitor 78 does not conduct direct current, it eliminates the direct voltages delivered by the two transistors out of the four which have their inputs kept at a constant level by the two governing signals, out of the four possible ones B, $\overline{B}$, D and $\overline{D}$, which are in the 1 state.

As the quadrature signals delivered by flip-flop 62 are coordinated with those delivered by flip-flop 59, the additions of the effects of the states on the pairs of gates 69–70 and 71–72, agree with formula (1). Line 79, therefore, really transmits the signal 2MA4Q.

It must be noted that gates 69 to 72 constitute, with transistors 73 to 76, a numerical-analogical converter of a type which is described in French Patent Application No. 79 09880 dated Apr. 19, 1979.

Figure 7:
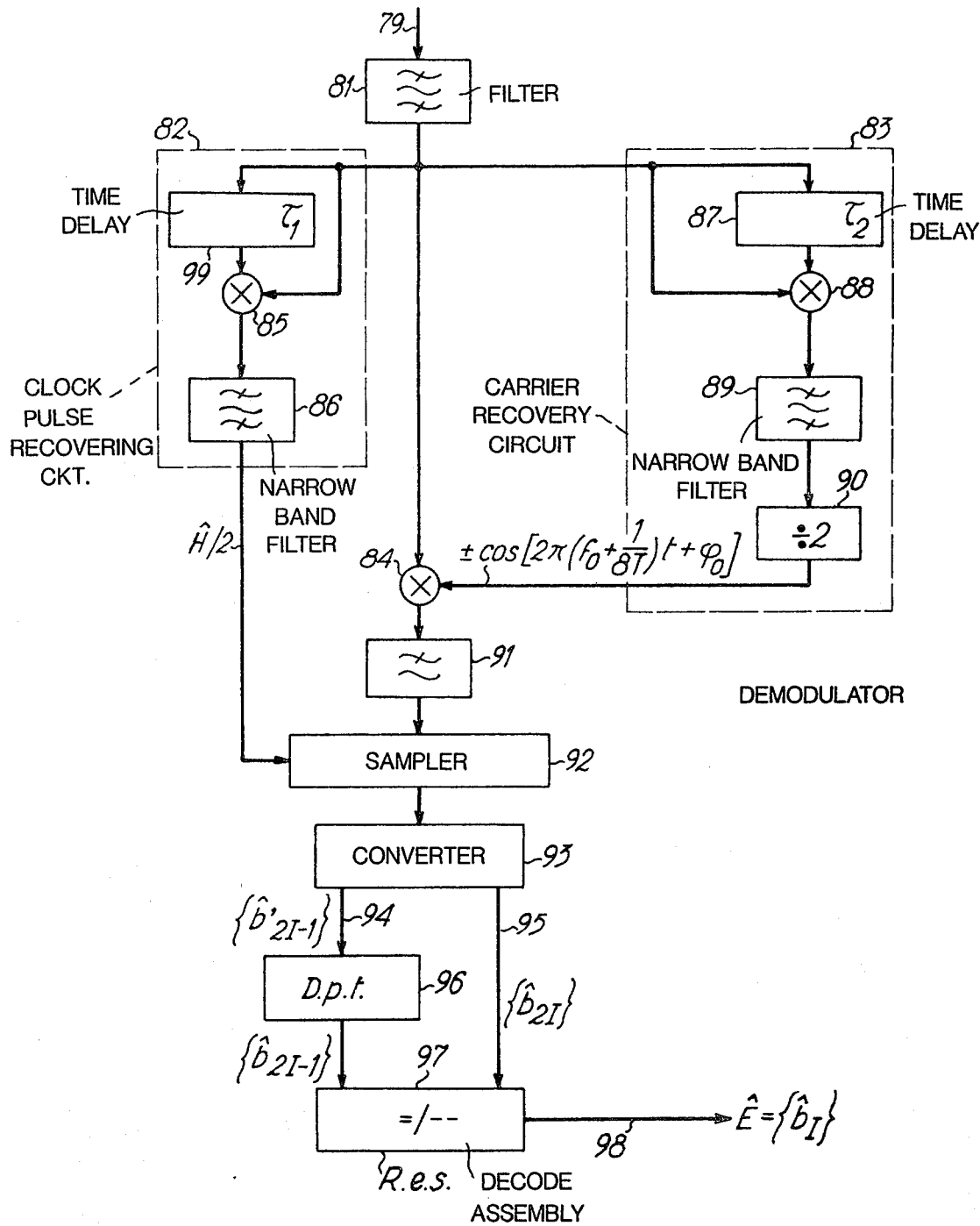
FIG. 7 is a block diagram of a demodulation device according to the present invention.

FIG. 7 represents the diagram of a demodulating device capable of demodulating the signal with quadrature modulation.

Line 79 is connected to the other input of a filter 81 the output of which is connected, for one part, to the input of a clock recovering circuit 82 and, for the other part, to the input of a carrier recovery circuit 83 and, finally, to an input of a multiplying device 84.

The clock recovery circuit 82 has its input connected, for one part, to the input of a time delay circuit 99 the output of which is connected to an input of a multiplying device 85 and, for the other part, to the input of multiplying device 85. The output of multiplying device 85 is connected to the input of a filter 86 with a narrow band. The time lag $\tau 1$ caused by circuit 99 is adjusted so as to obtain the best possible clock reference. The multiplying of the signal received in clock pulse recovery circuit 82, delayed by its otn period in order to make appear a line at the clock frequency H/2, then the filtering of that line in filter 86 to eliminate as much as possible the noise, are conventional in themselves. Preferably, filter 86 is a phase locking loop. The output of filter 86 delivers the recovered clock signal $\hat{H}/2$.

The carrier recovery circuit 83 has its input connected, for one part, to the input of a time delay circuit 87 the output of which is connected to the input of a multiplying device 88 and, for the other part, to the other input of the multiplying device 88. The output of multiplying device 88 is connected to the input of a narrow band filter 89 centered on $(2f_o + \frac{1}{4}T)$. The delay $\tau 2$ brought by circuit 87 is adjusted so to obtain the best carrying reference. Indeed, time delay circuit 87 and multiplying device 88, are of the same type as the conventional circuit for clock pulse recovery, which makes it possible to obtain a signal which presents lines (pure frequencies) at the frequencies $(2f_o \pm \frac{1}{4}T)$, that is to say at the frequencies which are double the frequencies necessary for the simplified demodulation according to formula (6). The adjusting of time delay $\tau 2$ may lead to a value different from that of $\tau 1$. That is the reason why separate recovery circuits have been provided for the clock pulses and for the carrier. Filter 89 preferably is a phase locking loop. The output of filter 89 is connected to a divider by two, 90, which delivers the signal $\pm y(t)$. It appears, therefore, that the reference of the carrier is obtained with a phase ambiguity $\pi$. The output of divider 90 is connected to the other multiplying device 84.

The output of multiplying device 84 is connected to the input of a low pass filter 91, the output of which is connected to the signal input of a sample 92 the clock input of which is connected to the output of circuit 82. The output of sampler 92 is connected to an analogical converter 93 with three thresholds 2U, 0 and $-2U$ which delivers quaternary words of two binary elements. Output 94 of converter 93 delivers the most significant heavy weight binary element of the quaternary word while output 95 delivers the least significant low weight binary element. Output 94 is connected to the input of a decoding circuit 96 by transition, which performs a modulo 2 addition on the most significant running heavy weight binary element $\hat{b}'_{2I-1}$ of the preceding binary element $\hat{b}'_{2I-3}$ to deliver the decoded binary element $\hat{b}_{2I-1}$.

The output of decoding device 96 and the output 95 of converter 93, which delivers the binary element $\hat{b}_{2I}$, are connected to the inputs of a code assembly circuit 97 for placing the codes in series, the output of which delivers on wire 98 the binary numerical train or succession $E \cong \{b_I\}$ which has been reconstituted.

The result of the multiplication in multiplier 84 corresponds to formula (4) indicated above. Filter 91 makes it possible to preserve only the low frequency components. Circuits 92, 93, 96 and 97 are conventional circuits in the technical field of numerical transmissions.

We claim:

1. A modulator operating with a double amplitude four-level mudulation in phase quadrature on two carrier components, each of said two carrier components having a cyclic recurrence of bit time periods which define a basic time cycle, said two carrier components having a predetermined phase relationship with each other, said modulator comprising means for shifting the phases of two binary trains of digital input pulses in order to encode the two binary trains by one/half of a bit time period in the basic time cycle, means for modulating said respective carrier components responsive to said encoded trains of digital input pulses, and means for adding the two modulated carrier components in order to produce an output signal.

2. The modulator according to claim 1, further comprising means for differentially encoding one of the trains of digital pulses.

3. The modulator according to claim 2, further comprising first even-uneven separator means having an input terminal for receiving a first binary train of digital input pulses, encoding means having an input coupled to an output of said first even-uneven separator means for encoding said binary train of input pulses, second even-uneven separator means having an input coupled to an output of said encoding means, the second even-uneven separator means having two outputs for producing said two binary trains of digital input pulses, two sign control circuit means individually associated with the two outputs of said second even-uneven separator means, each of said two sign control circuit means changing the sign of every other signal which is applied to it, whereby said two sign control circuit means respectively cause a change of sign of every other signal appearing at said two outputs, two quaternary signal encoding means respectively coupled to outputs of said two circuit means, two multiplying means respectively coupled to the outputs of said two quaternary encoding means, means for applying said two carrier components to respective second inputs of each of said two multiplying means, the carrier component applied to each multiplying means having the same given frequency, said adding means being coupled to outputs of said two multiplying means.

4. A demodulator for a signal modulated by a double amplitude four-level modulation in phase quadrature on two carrier components, each of said two carrier components having a cyclic recurrence of bit time periods which define a basic time cycle, said two carrier components having a predetermined phase relationship with each other, said carrier components being modulated by two encoded binary trains of phase shifted digital input pulses, the phase shift being one/half of a bit time period; said demodulator comprising carrier recovery circuit means, clock recovery circuit means, multiplying means having two inputs; a signal input terminal coupled to an input of said carrier recovery circuit means, to an input of said clock recovery circuit means, and to an input of said multiplying means; the other input of said multiplying means being coupled to an output of said carrier recovery circuit; low-pass filter means coupled to an output of said multiplying means; sampler circuit means coupled to the output of said low-pass filter means, said sampler circuit means having a clock input which is coupled to the output of said clock recovery circuit means; a three threshold analog converter means coupled to the output of said sampler circuit means; decoder means coupled to one output of said analog converter means, said decoder means decoding the output of said sampler; and assembly means responsive to said decoder means for delivering an output corresponding to said modulation.

5. A modulation/demodulation system for signals modulated by a double amplitude four-level mudulation in phase quadrature on two carrier components, each of said two carrier components having a cyclic recurrence of bit time periods which define a basic time cycle, said two carrier components having a predetermined phase relationship with each other, said carrier components being modulated by two encoded binary trains of phase shifted digital input pulses; the modulator of said system comprising a first even-uneven separator means having an input terminal for receiving a first binary train of digital input pulses; encoding means having an input coupled to an output of said first even-uneven separator means for encoding said binary train of input pulses; second even-uneven separator means having an input coupled to an output of said encoding means, the second even-uneven separator means having two outputs for producing said two binary trains of digital input pulses; two sign control circuit means individually associated with the two outputs of said second even-uneven separator means, each of said two sign control circuit means changing the sign of every other signal which is applied to it, whereby said two sign control circuit means respectively cause a change of sign for every other signal appearing at said two outputs; two quaternary signal encoding means respectively coupled to outputs of said two circuit means; two multiplying means respectively coupled to the outputs of said two quaternary encoding means, means for applying said two carrier components to respective second inputs of each of said two multiplying means, the carrier component applied to each multiplying means having the same given frequency; and adding means coupled to outputs of said two mutiplying means, said adding means delivering the modulated signal at its output; said demodulator of said system comprising a carrier recovery circuit means, clock recovery circuit means, multiplying means having two inputs; a signal input terminal coupled to an input of said carrier recovery circuit means, to an input of said clock recovery circuit means, and to an input of said multiplying means; the other input of said multiplying means being coupled to an output of said carrier recovery circuit; low-pass filter means coupled to an output of said multiplying means; sampler circuit means coupled to the output of said low-pass filter means, said sampler circuit means having a clock input which is coupled to the output of said clock recovery circuit means; a three threshold analog converter means coupled to the output of said sampler circuit means; decoder means coupled to one output of said analog converter means, said decoder means decoding the output of said sampler; and assembly means responsive to said decoder means for delivering an output corresponding to said modulation.

* * * * *